(12) United States Patent
Huang

(10) Patent No.: US 8,482,866 B2
(45) Date of Patent: Jul. 9, 2013

(54) LENS WITH LAYERED CONCENTRIC STRUCTURES

(75) Inventor: Wen-I Huang, Luzhu Township, Taoyuan County (TW)

(73) Assignee: IR-Tec International Ltd., Taoyuan County (TW)

(*) Notice: Subject to any disclaimer, the term of this patent is extended or adjusted under 35 U.S.C. 154(b) by 112 days.

(21) Appl. No.: 13/162,593

(22) Filed: Jun. 17, 2011

(65) Prior Publication Data
US 2012/0320464 A1 Dec. 20, 2012

(51) Int. Cl.
*G02B 3/08* (2006.01)

(52) U.S. Cl.
USPC .......................................... 359/742; 359/741

(58) Field of Classification Search
USPC .................... 359/619, 621, 741, 742
See application file for complete search history.

(56) References Cited

U.S. PATENT DOCUMENTS

2006/0256452 A1* 11/2006 Lung ............................ 359/742

* cited by examiner

*Primary Examiner* — William Choi
(74) *Attorney, Agent, or Firm* — Leong C. Lei

(57) ABSTRACT

The lens contains a cup-shaped body with a lens bottom and a lens member extended upward from the lens bottom and forming a 49-degree included angle with the lens bottom. The lens member contains, from bottom to top, a number of layers, each having a number of refraction portions. Each refraction portion contains a number of refraction elements arranged in a concentric manner. According to the inclination angle of the lens member, dimensions of the refraction portions, and the distribution of refraction elements, the lens could be applied to various applications with enhanced coverage range and sensory effect.

8 Claims, 16 Drawing Sheets

LENS WITH LAYERED CONCENTRIC STRUCTURES

TECHNICAL FIELD OF THE INVENTION

The present invention is generally related to lens for use with sensors, and more particularly to a lens having a layered structure where each layer has a number of concentric refraction elements.

DESCRIPTION OF THE PRIOR ART

A sensor is conventionally equipped with a lens to enhance its coverage range. However, the lens can only achieve a limited effect.

The reason lies in that the lens is of a specific focus length. When the sensor is deployed in an application requiring a different focus length, the sensor with a lens of inadequate focus length obviously cannot fulfill the application's requirement.

SUMMARY OF THE INVENTION

An objective of the present invention is to provide a lens having a layered structure and each layer has a number of concentric refraction elements so as to enhance sensed signal strength and to enlarge sensor coverage range.

To achieve the foregoing objective, the lens of the present invention contains a cup-shaped body with a lens bottom and a lens member extended upward from the lens bottom and forming an included angle with the lens bottom. The lens member contains a number of layers, each having a number of refraction portions. Each refraction portion in turn contains a bottom side, a top side parallel to the bottom side, and two lateral sides connecting the two ends of the bottom and top sides, respectively. Each refraction portion also contains a number of refraction elements arranged in a concentric manner.

The present inventor provides a number of embodiments of the lens having different number of layers and thereby achieving different refraction effects. As such, the lens could be applied to various applications, obviating the conventional problem of single-focus-length lens. The lens taught by the present inventor has a different inclination angle and refraction structure so that the sensor could have enhanced coverage range and sensory effect.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
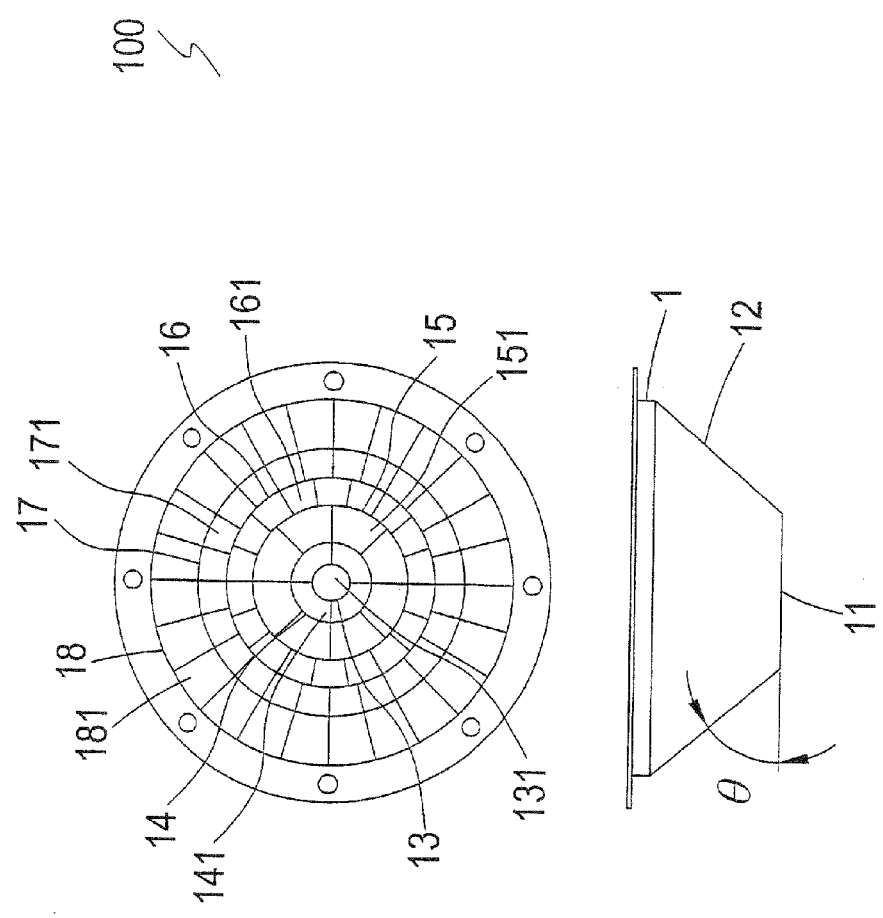
FIG. 1 provides the top and side views a lens according to a first embodiment of the present invention.

FIG. 1 provides the top and side views a lens 100 according to a first embodiment of the present invention. The lens 100 has a body 1 of a cup shape with a lens bottom 11 and a lens member 12 extended upward from the lens bottom 11. An included angle θ between 46 to 52 degrees is formed between the cut member 12 and the lens bottom 11. Preferably, θ is 49 degree.

Figure 2:
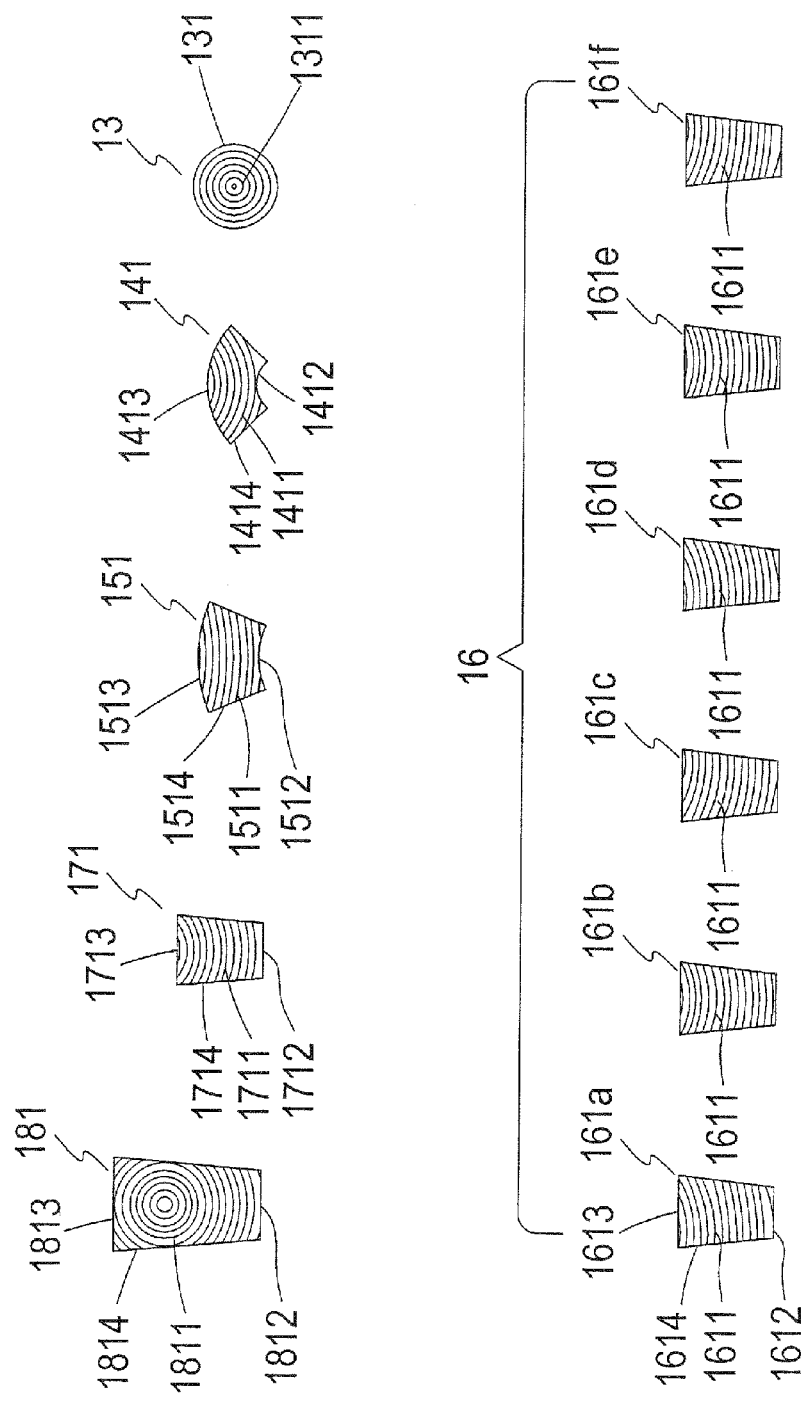
FIG. 2 shows the distribution of refraction elements of each layer's refraction portion of the lens shown in FIG. 1.

As further shown in FIG. 2, the body 1 has a layered structure having, from the lens bottom 11 upward, a first layer 13, a second layer 14, a third layer 15, a fourth layer 16, a fifth layer 17, and a sixth layer 18. The first layer 13 has a refraction portion 131 containing a number of refraction elements 1311. Similarly, the second to the sixth layers 14, 15, 16, 17, and 18 have respective refraction portions 141, 151, 161, 171, and 181 which in turn contain a number of respective refraction elements 1411, 1511, 1611, 1711, and 1811. The refraction elements 1311, 1411, 1511, 1611, 1711, and 1811 are arranged in a concentric manner respectively.

If the refraction elements 1311, 1411, 1511, 1611, 1711, and 1811 are depicted altogether in FIG. 1, FIG. 1 would be too confusing to read. Therefore, instead, the refraction elements 1311, 1411, 1511, 1611, 1711, and 1811 are depicted separately in FIG. 2.

As shown in FIG. 2, the distributions of the refraction elements 1311, 1411, 1511, 1611, 1711, and 1811 within the respective refraction portions 131, 141, 151, 161, 171, and 181 are different. For the fourth layer 16, according to the refraction elements 1611's distribution, the refraction portion 161 could be divided into refraction sections 161a, 161b, 161c, 161d, 161e, and 161f.

As to the refraction portion 131, it has a circular shape of diameter 4.6 mm and the refraction elements 1311 are configured as concentric circles. The tolerance of the distance between neighboring refraction elements 1311 is ±0.05 mm. Similarly, the tolerance of the respective distance between neighboring refraction elements 1411, 1511, 1611, 1711, or 1811 is also ±0.05 mm.

The refraction portion 141 has an arc-shaped bottom side 1412, an arc-shaped top side 1413 parallel to the bottom side 1412, and two lateral sides 1414 connecting the two ends of the bottom and top sides 1412 and 1413, respectively. The length of the bottom side 1412 is between 3.15 to 3.35 mm, the length of the top side 1413 is between 8.06 to 8.26 mm, and the length of each lateral side 1414 is between 2.39 to 2.59 mm.

The refraction portion 151 has an arc-shaped bottom side 1512, an arc-shaped top side 1513 parallel to the bottom side 1512, and two lateral sides 1514 connecting the two ends of the bottom and top sides 1512 and 1513, respectively. The length of the bottom side 1512 is between 4.34 to 4.54 mm, the length of the top side 1513 is between 7.55 to 7.75 mm, and the length of each lateral side 1514 is between 3.81 to 4.01 mm.

The refraction portion 161 has a bottom side 1612, a top side 1613 parallel to the bottom side 1612, and two lateral sides 1614 connecting the two ends of the bottom and top sides 1612 and 1613, respectively. The length of the bottom side 1612 is between 3.4 to 3.6 mm, the length of the top side 1613 is between 4.9 to 5.1 mm, and the length of each lateral side 1614 is between 6.5 to 6.7 mm.

The refraction portion 171 has a bottom side 1712, a top side 1713 parallel to the bottom side 1712, and two lateral sides 1714 connecting the two ends of the bottom and top sides 1712 and 1713, respectively. The length of the bottom side 1712 is between 3.7 to 3.9 mm, the length of the top side 1713 is between 4.7 to 4.9 mm, and the length of each lateral side 1714 is between 5.9 to 6.1 mm.

The refraction portion 181 has a bottom side 1812, a top side 1813 parallel to the bottom side 1812, and two lateral sides 1814 connecting the two ends of the bottom and top sides 1812 and 1813, respectively. The length of the bottom side 1812 is between 4.7 to 4.9 mm, the length of the top side 1813 is between 6.4 to 6.6 mm, and the length of each lateral side 1814 is between 10.1 to 10.3 mm.

The inclination of the lens member 12 relative to the lens bottom 11 is for altering the refraction angle of a sensor, the refraction portions 131, 141, 151, 161, 171, and 181 determines the strength of the sensor's power, and the refraction elements 1311, 1411, 1511, 1611, 1711, and 1811 are for focusing.

Figure 3:
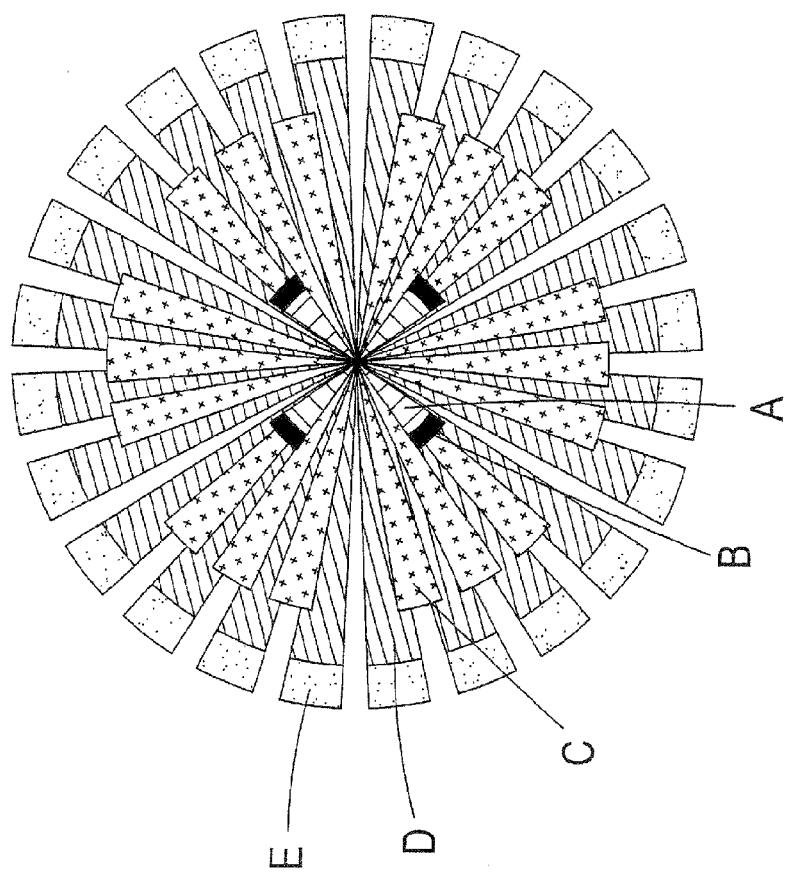
FIG. 3 is a top view diagram showing the distribution of sensed signal of the lens shown in FIG. 1.
Figure 4:
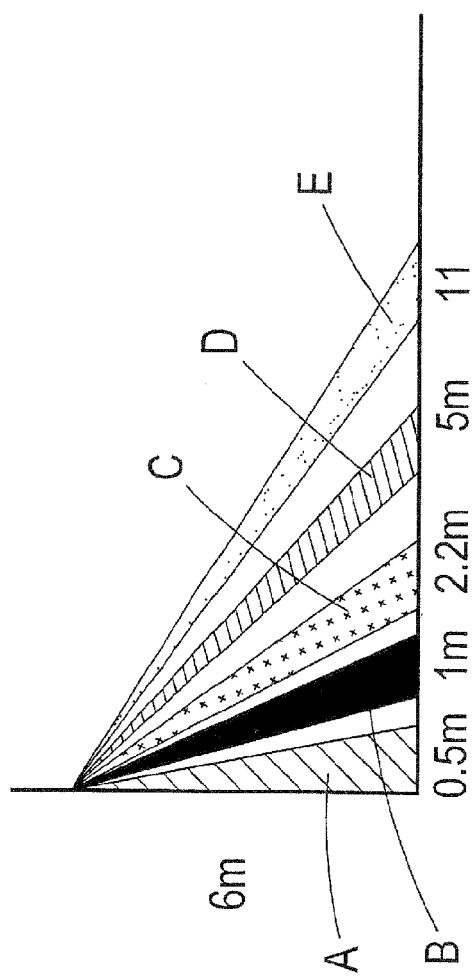
FIG. 4 is a side view diagram showing the distribution of sensed signal of the lens shown in FIG. 1.

FIG. 3 is a top view diagram showing the distribution of sensed signal of the lens 100 shown in FIG. 1. FIG. 4 is a side view diagram showing the distribution of sensed signal of the lens 100 shown in FIG. 1. As illustrated, even though the lens 100 contains six refraction layers and as the first layer 13 is located at the lens bottom 11, its sensed signal is perpendicular to the lens bottom 11 and is therefore omitted.

FIGS. 3 and 4 depict five sensed signals, A, B, C, D, and E, which are the signals refracted by the second, third, fourth, fifth, and sixth layers 14, 15, 16, 17, and 18, respectively. The five signals manifest a radial distribution in the top view diagram shown in FIG. 3.

Figure 5:
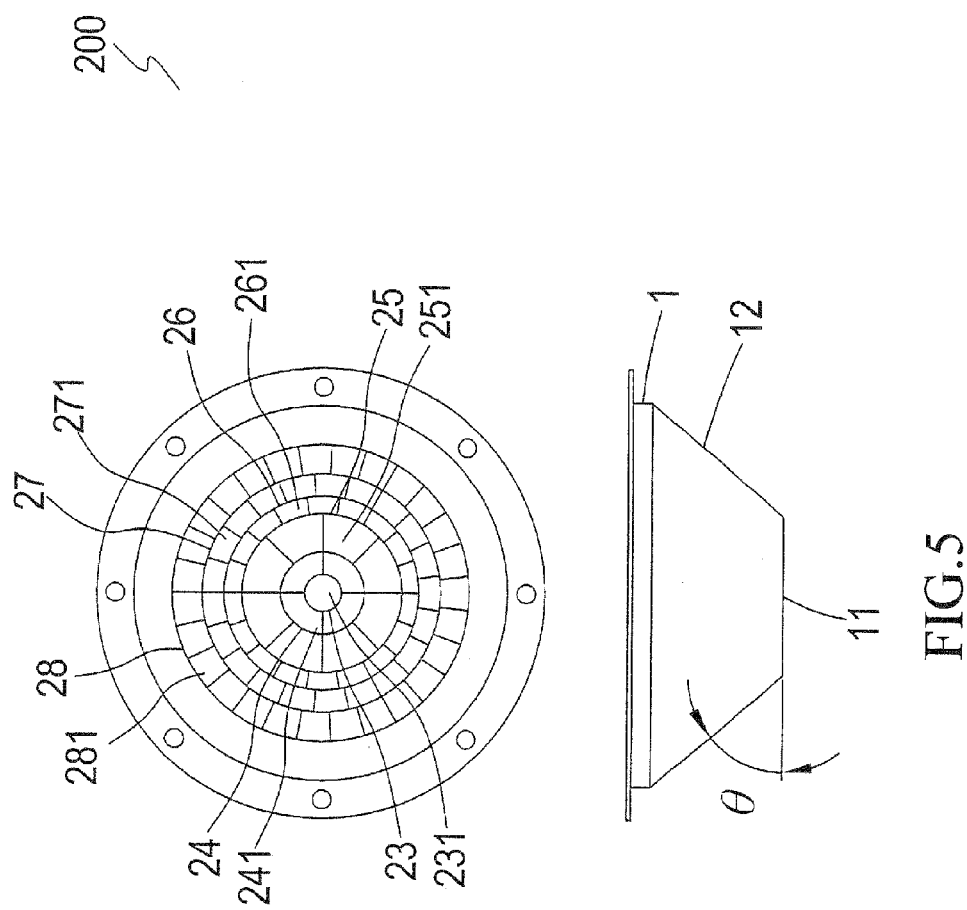
FIG. 5 provides the top and side views a lens according to a second embodiment of the present invention.
Figure 6:
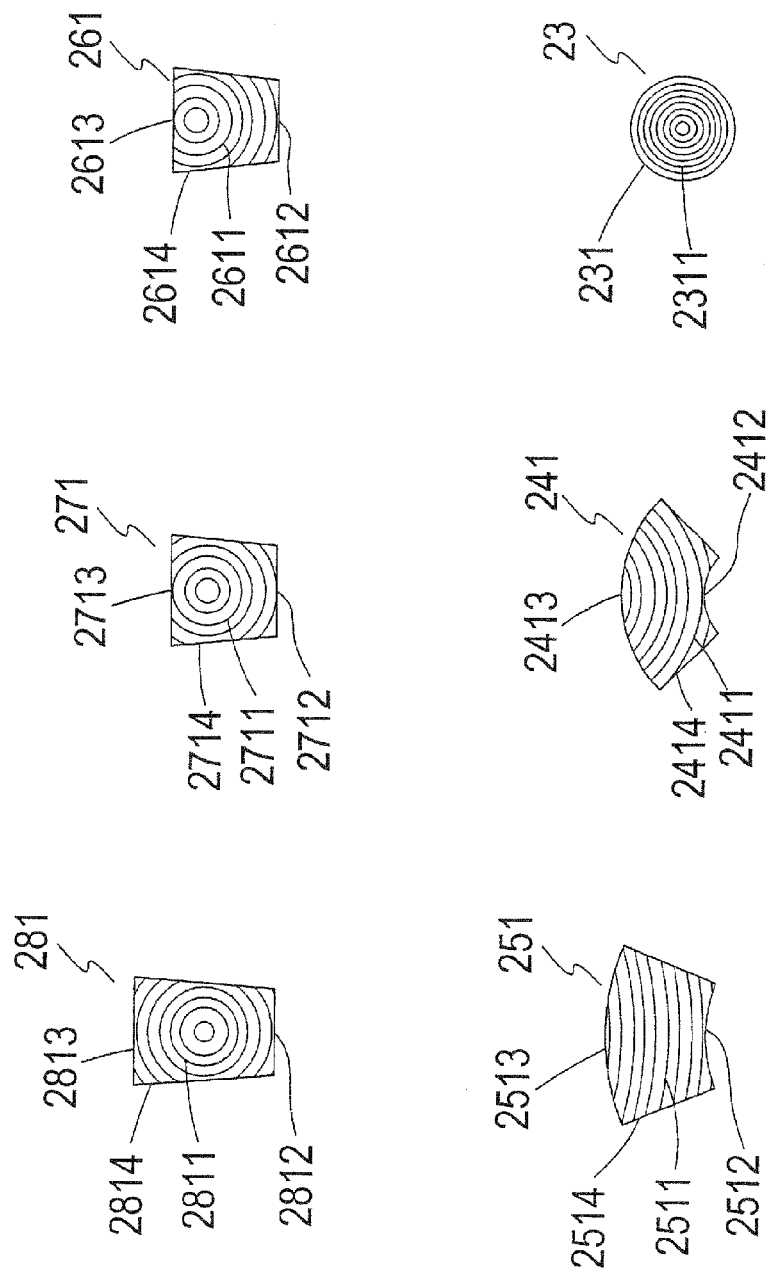
FIG. 6 shows the distribution of refraction elements of each layer's refraction portion of the lens shown in FIG. 5.

FIG. 5 provides the top and side views a lens 200 according to a second embodiment of the present invention. FIG. 6 shows the distribution of refraction elements of each layer's refraction portion of the lens 200 shown in FIG. 5. As illustrated, the components of the lens 200 are generally identical to those of the lens 100 of the first embodiment and therefore the same components are denoted by the same reference numbers. The lens 200 has a first layer 23, a second layer 24, a third layer 25, a fourth layer 26, a fifth layer 27, and a sixth layer 28. The first layer 23 has a refraction portion 231 containing a number of refraction elements 2311 arranged as concentric circles. The second layer 24 has a number of refraction portions 241, each containing a number of refraction elements 2411 arranged as concentric circles. The third layer 25 has a number of refraction portions 251, each containing a number of refraction elements 2511 arranged as concentric circles. The fourth layer 26 has a number of refraction portions 261, each containing a number of refraction elements 2611 arranged as concentric circles. The fifth layer 27 has a number of refraction portions 271, each containing a number of refraction elements 2711 arranged as concentric circles. The sixth layer 28 has a number of refraction portions 281, each containing a number of refraction elements 2811 arranged as concentric circles.

Please note that the distributions of the refraction elements 2311, 2411, 2511, 2611, 2711, and 2811 within the respective refraction portions 231, 241, 251, 261, 271, and 281 are different from those of the first embodiment. Additionally, even though that the dimensions of the refraction portions 231, 241, and 251 of the first, second, and third layers 23, 24, and 25 are identical to those of the first embodiment, the dimensions of the refraction portions 261, 271, and 281 of the fourth, fifth, and sixth layers 26, 27, and 28 are identical to those of the first embodiment. As the dimensions of the refraction portions 231, 241, and 251 of the first, second, and third layers 23, 24, and 25 are identical to those of the first embodiment, their description is omitted.

The refraction portion 261 has a bottom side 2612 whose length is between 3.39 to 3.59 mm, a top side 2613 whose length is between 4.41 to 4.61 mm, and two lateral sides 2614 whose length is between 4.4 to 4.6 mm.

The refraction portion 271 has a bottom side 2712 whose length is between 3.77 to 3.97 mm, a top side 2713 whose length is between 4.65 to 4.85 mm, and two lateral sides 2714 whose length is between 4.4 to 4.6 mm.

The refraction portion 281 has a bottom side 2812 whose length is between 3.59 to 3.79 mm, a top side 2813 whose length is between 4.5 to 4.7 min, and two lateral sides 2814 whose length is between 5.9 to 6.1 mm.

Since the operation principle of the second embodiment is the same as the first embodiment, the description to the second embodiment is omitted.

Figure 7:
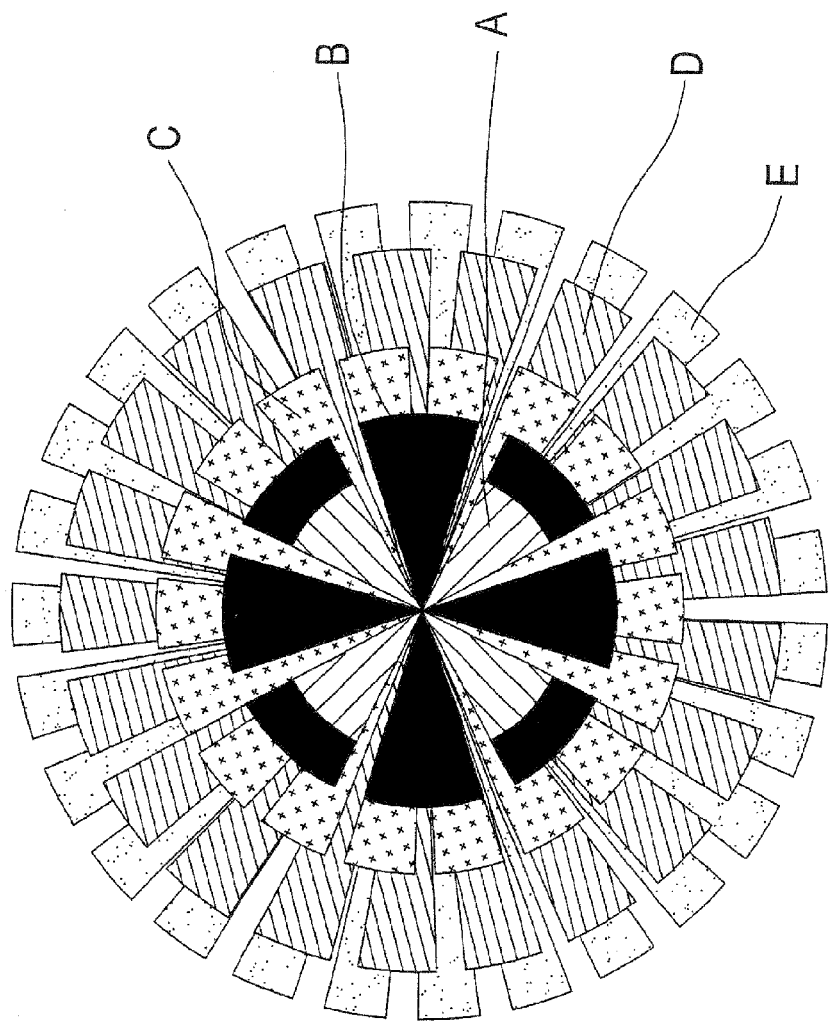
FIG. 7 is a top view diagram showing the distribution of sensed signal of the lens shown in FIG. 5.
Figure 8:
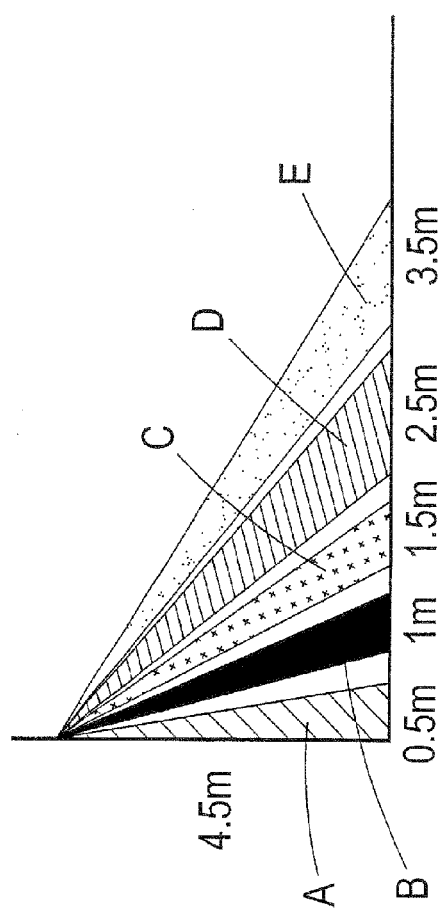
FIG. 8 is a side view diagram showing the distribution of sensed signal of the lens shown in FIG. 5.

FIG. 7 is a top view diagram showing the distribution of sensed signal of the lens 200 shown in FIG. 5. FIG. 8 is a side view diagram showing the distribution of sensed signal of the lens 200 shown in FIG. 5. As illustrated, even though the lens 200 contains six refraction layers and as the first layer 23 is located at the lens bottom 11, its sensed signal is perpendicular to the lens bottom 11 and is therefore omitted.

FIGS. 7 and 8 depict five sensed signals, A, B, C, D, and E, which are the signals refracted by the second, third, fourth, fifth, and sixth layers 24, 25, 26, 27, and 28, respectively. The five signals manifest a radial distribution in the top view diagram shown in FIG. 7.

Figure 9:
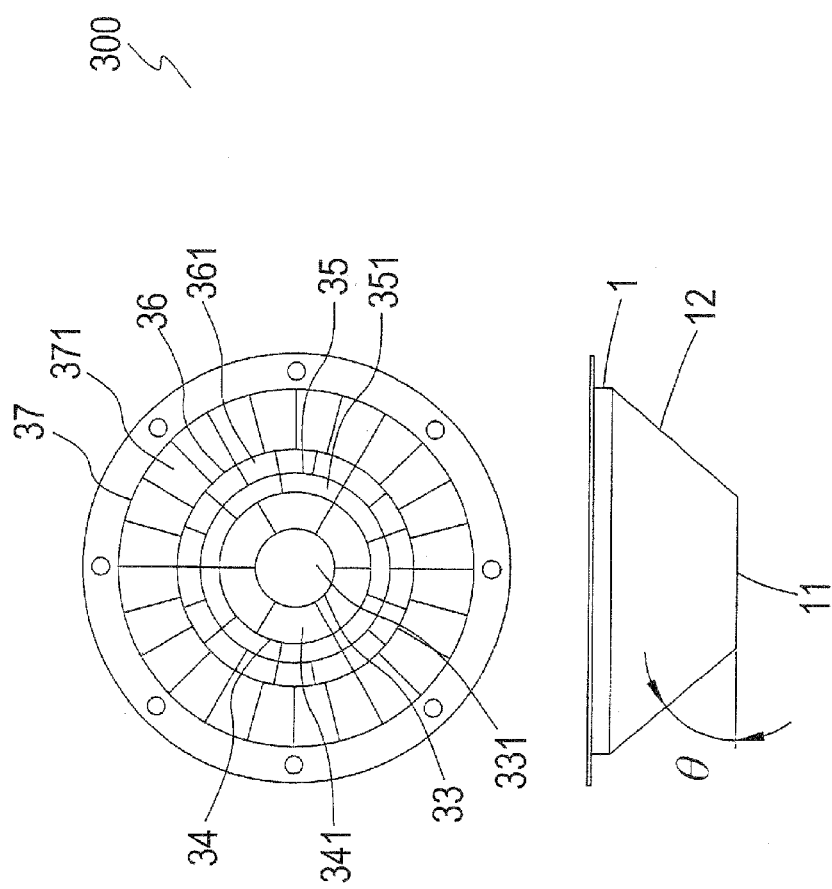
FIG. 9 provides the top and side views a lens according to a third embodiment of the present invention.
Figure 10:
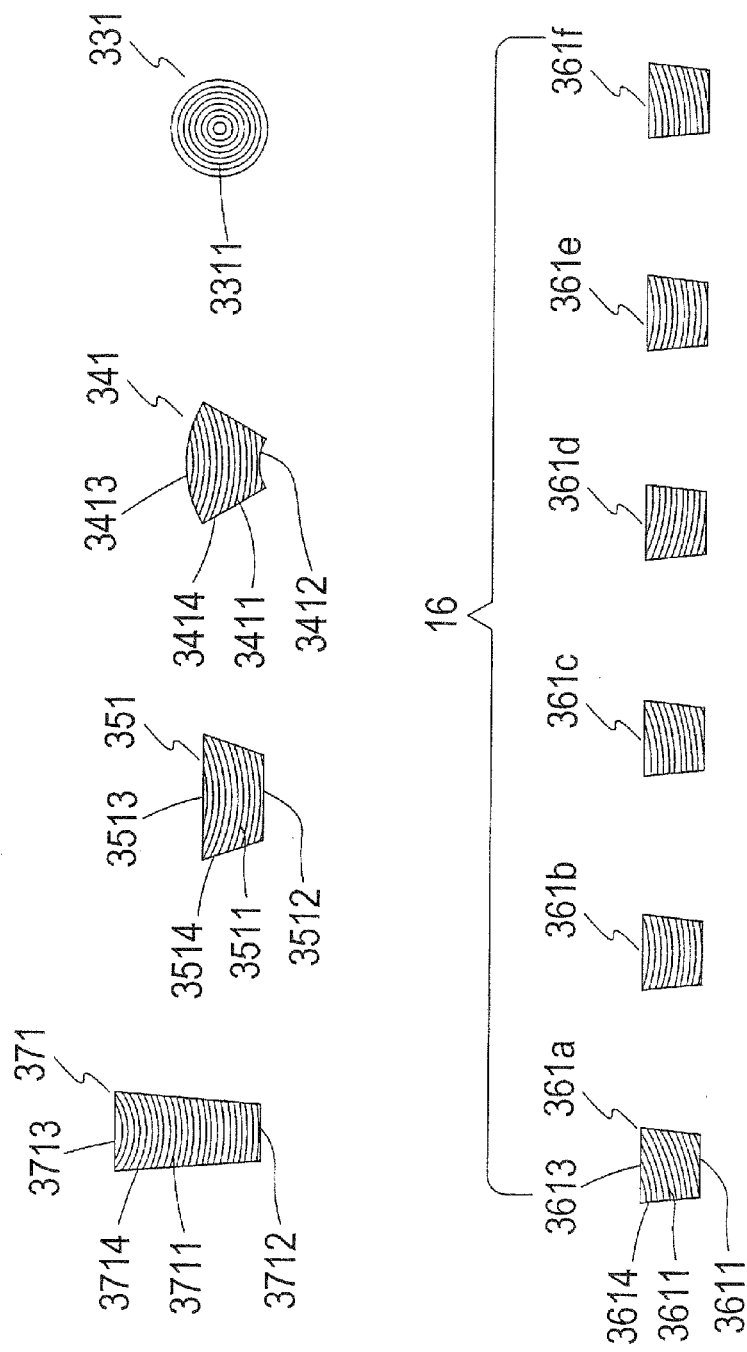
FIG. 10 shows the distribution of refraction elements of each layer's refraction portion of the lens shown in FIG. 9.

FIG. 9 provides the top and side views a lens 300 according to a third embodiment of the present invention. FIG. 10 shows the distribution of refraction elements of each layer's refraction portion of the lens 300 shown in FIG. 9. As illustrated, the components of the lens 300 are generally identical to those of the lenses 100 and 200 of the previous embodiments and therefore the same components are denoted by the same reference numbers. The lens 300 has a first layer 33, a second layer 34, a third layer 35, a fourth layer 36, and a fifth layer 37. The first layer 33 has a refraction portion 331 containing a number of refraction elements 3311 arranged as concentric circles. The second layer 34 has a number of refraction portions 341, each containing a number of refraction elements 3411 arranged as concentric circles. The third layer 35 has a number of refraction portions 351, each containing a number of refraction elements 3511 arranged as concentric circles. The fourth layer 36 has a number of refraction portions 361, each containing a number of refraction elements 3611 arranged as concentric circles. The fifth layer 37 has a number of refraction portions 371, each containing a number of refraction elements 3711 arranged as concentric circles.

For the fourth layer 36, according to the refraction elements 3611's distribution, the refraction portion 361 could be divided into refraction sections 361a, 361b, 361c, 361d, 361e, and 361f.

The refraction portion 331 has a circular shape of diameter 8 mm.

The refraction portion 341 has an arc-shaped bottom side 3412 whose length is between 3.9 to 4.1 mm, an arc-shaped top side 3413 whose length is between 9.9 to 10.1 mm, and two lateral sides 3414 whose length is between 5.1 to 5.3 mm.

The refraction portion 351 has a bottom side 3512 whose length is between 6.88 to 7.08 mm, a top side 3513 whose length is between 10.23 to 10.43 mm, and two lateral sides 3514 whose length is between 4.9 to 5.1 mm.

The refraction portion 361 has a bottom side 3612 whose length is between 5.06 to 5.26 mm, a top side 3613 whose length is between 6.11 to 6.31 mm, and two lateral sides 3614 whose length is between 4.9 to 5.1 mm.

The refraction portion 371 has a bottom side 3712 whose length is between 4.56 to 4.76 mm, a top side 3713 whose length is between 6.44 to 6.64 mm, and two lateral sides 3714 whose length is between 11.9 to 12.1 mm.

Since the operation principle of the third embodiment is the same as the previous embodiments, the description to the third embodiment is omitted.

Figure 11:
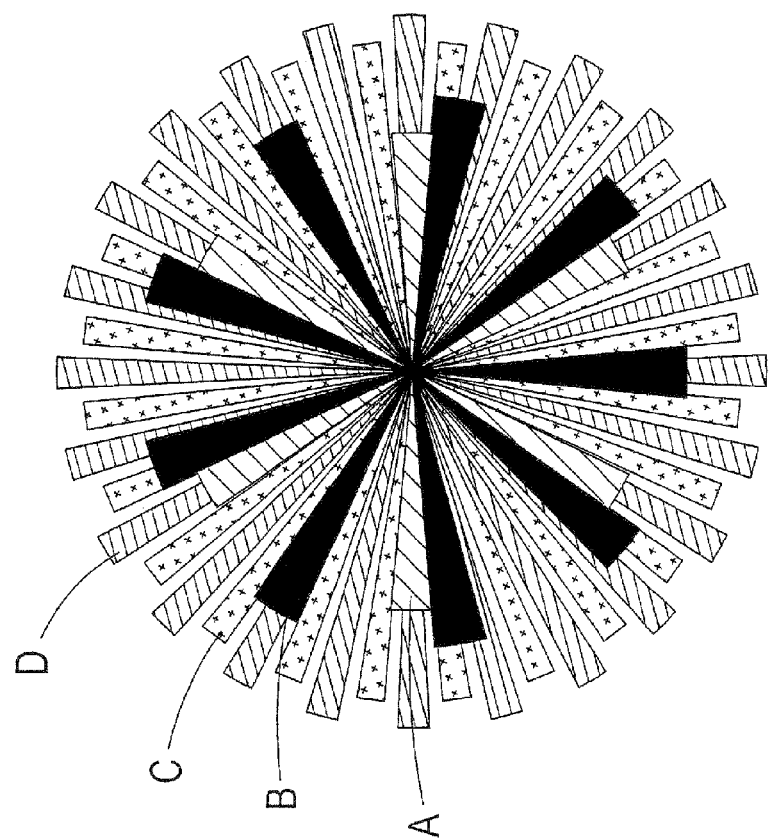
FIG. 11 is a top view diagram showing the distribution of sensed signal of the lens shown in FIG. 9.
Figure 12:
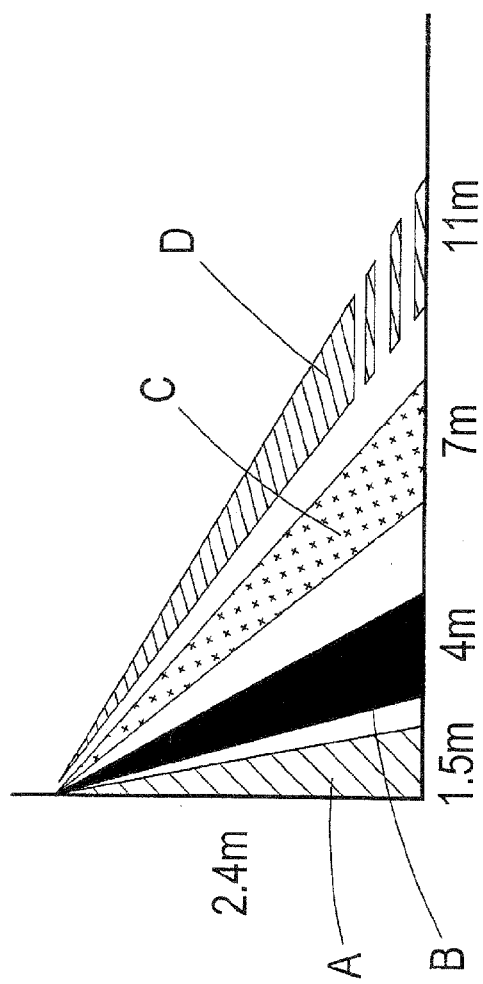
FIG. 12 a side view diagram showing the distribution of sensed signal of the lens shown in FIG. 9.

FIG. 11 is a top view diagram showing the distribution of sensed signal of the lens 300 shown in FIG. 9. FIG. 12 a side view diagram showing the distribution of sensed signal of the lens 300 shown in FIG. 9. As illustrated, even though the lens 200 contains five refraction layers and as the first layer 33 is located at the lens bottom 11, its sensed signal is perpendicular to the lens bottom 11 and is therefore omitted.

FIGS. 11 and 12 depict four sensed signals, A, B, C, and D, which are the signals refracted by the second, third, fourth, and fifth layers 34, 35, 36, and 37, respectively. The four signals manifest a radial distribution in the top view diagram shown in FIG. 11.

Figure 13:
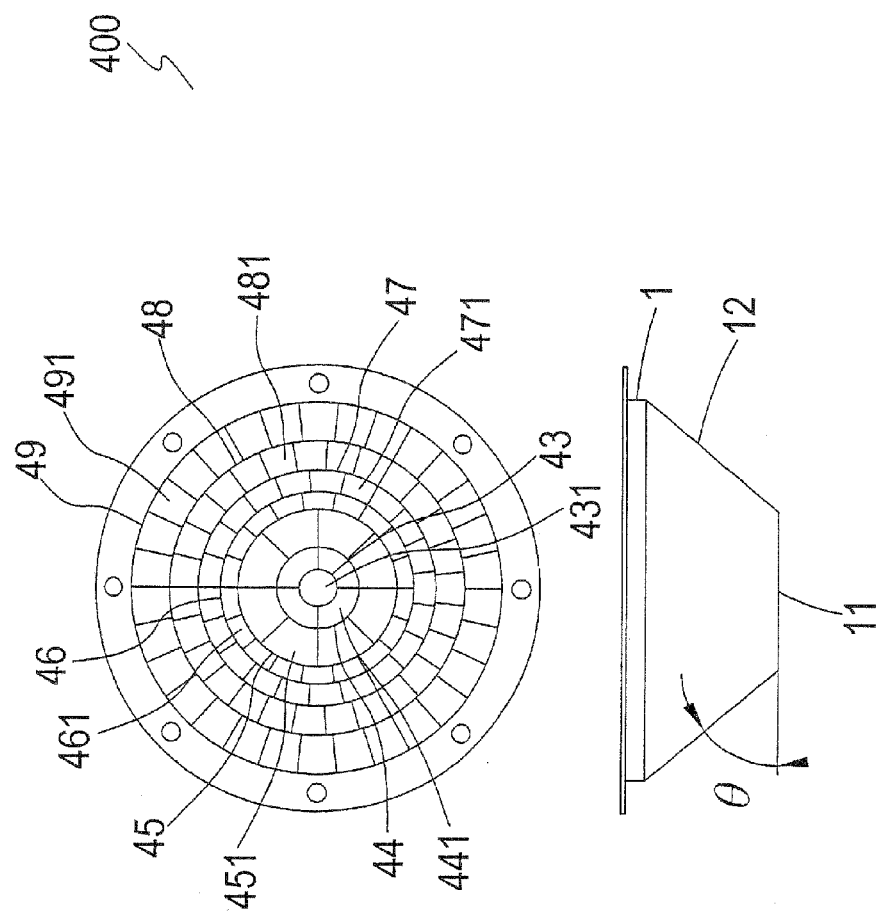
FIG. 13 provides the top and side views a lens according to a fourth embodiment of the present invention.
Figure 14:
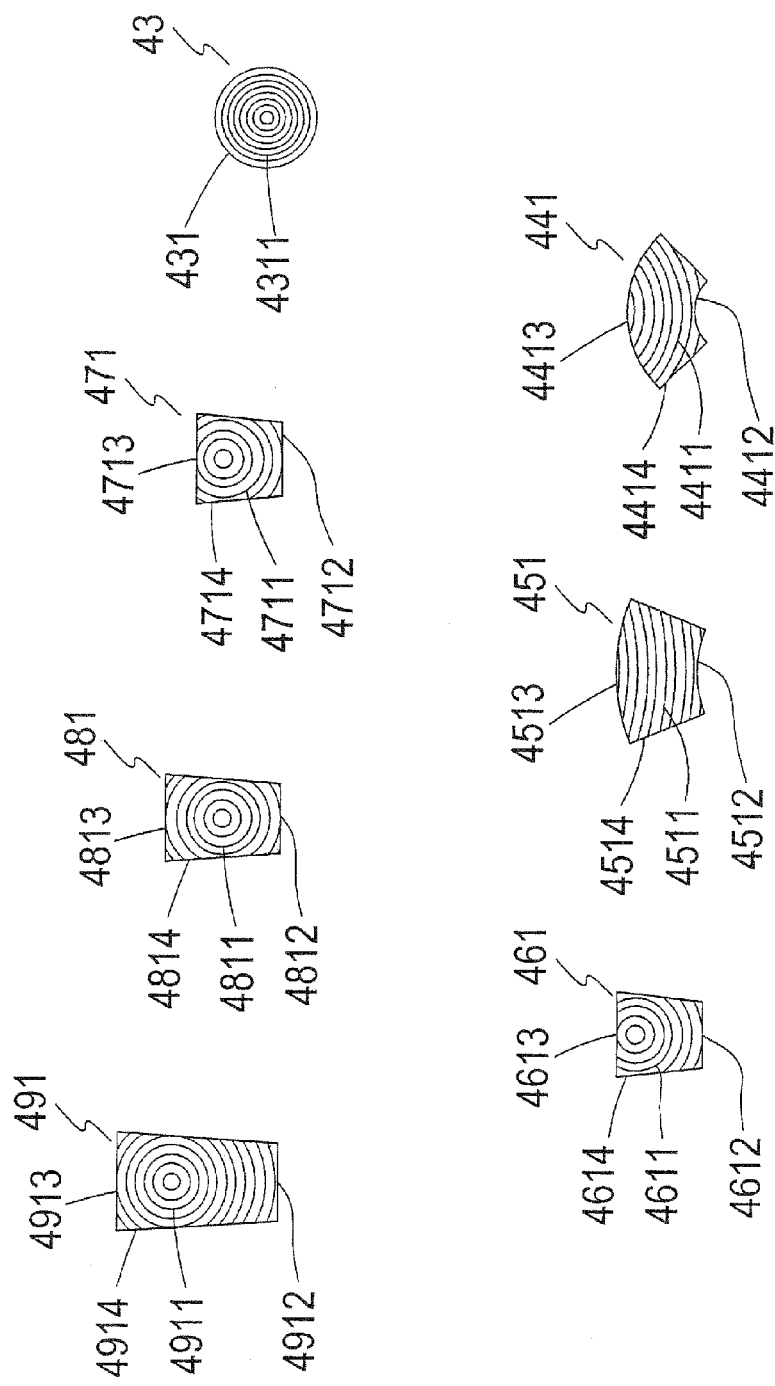
FIG. 14 shows the distribution of refraction elements of each layer's refraction portion of the lens shown in FIG. 13.

FIG. 13 provides the top and side views a lens 400 according to a second embodiment of the present invention. FIG. 14 shows the distribution of refraction elements of each layer's refraction portion of the lens 400 shown in FIG. 13. As illustrated, the components of the lens 400 are generally identical to those of the lens of the previous embodiments and therefore the same components are denoted by the same reference numbers. The lens 400 has a first layer 43, a second layer 44, a third layer 45, a fourth layer 46, a fifth layer 47, a sixth layer 48, and a seventh layer 49.

The first layer 43 has a refraction portion 431 containing a number of refraction elements 4311 arranged as concentric circles. The second layer 44 has a number of refraction portions 441, each containing a number of refraction elements 4411 arranged as concentric circles. The third layer 45 has a number of refraction portions 451, each containing a number of refraction elements 4511 arranged as concentric circles. The fourth layer 46 has a number of refraction portions 461, each containing a number of refraction elements 4611 arranged as concentric circles. The fifth layer 47 has a number of refraction portions 471, each containing a number of refraction elements 4711 arranged as concentric circles. The sixth layer 48 has a number of refraction portions 481, each containing a number of refraction elements 4811 arranged as concentric circles. The seventh layer 49 has a number of refraction portions 491, each containing a number of refraction elements 4911 arranged as concentric circles.

Please note that the dimensions of the refraction portions 431, 441, 451, 461, 471, and 481 are identical to those of the second embodiment and their description is therefore omitted. The additional seventh layer 49 in the present embodiment is located next to the sixth layer 48.

The refraction portion 491 has a bottom side 4912 whose length is between 4.04 to 4.24 mm, a top side 4913 whose length is between 5.13 to 5.33 mm, and two lateral sides 4914 whose length is between 8.4 to 8.6 mm.

Since the operation principle of the second embodiment is the same as the first embodiment, the description to the second embodiment is omitted.

Figure 15:
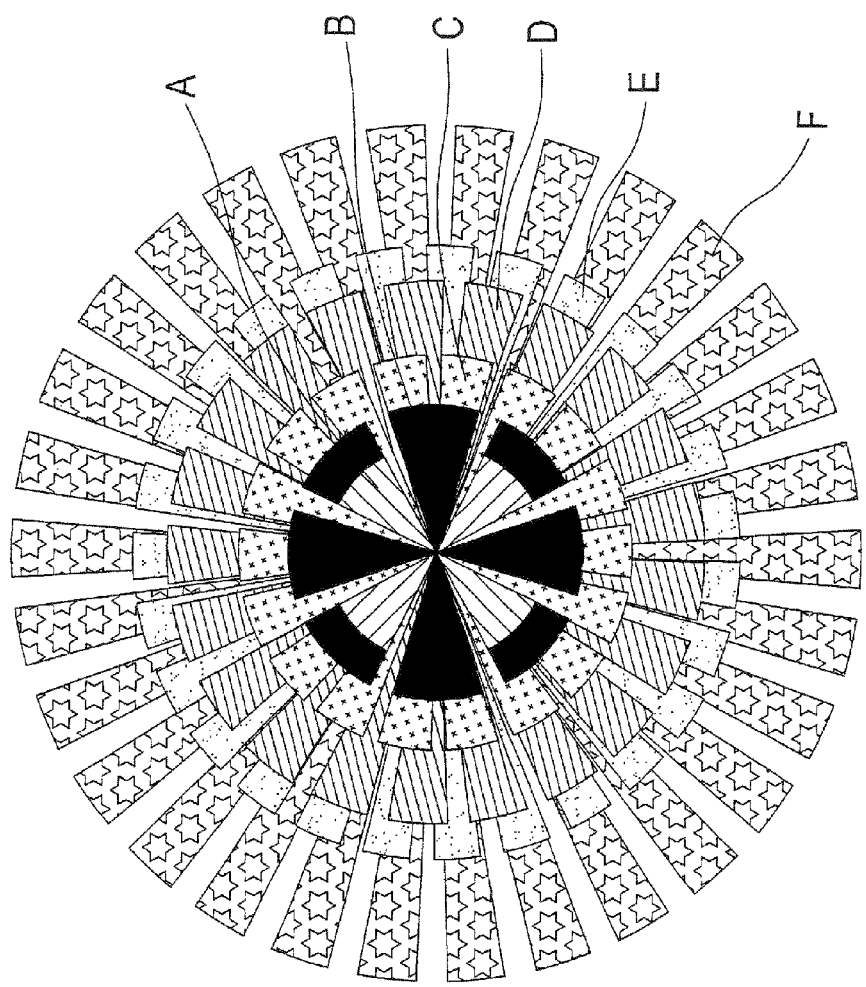
FIG. 15 is a top view diagram showing the distribution of sensed signal of the lens shown in FIG. 13.
Figure 16:
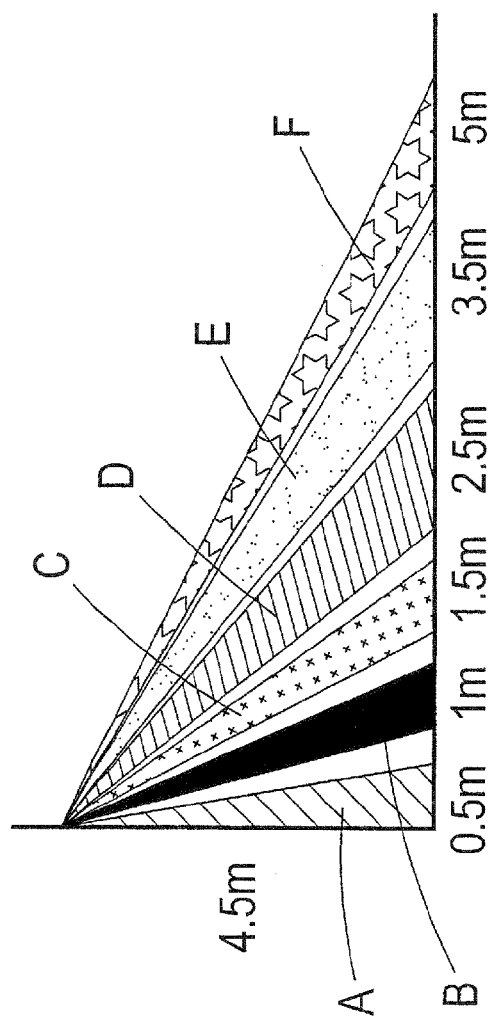
FIG. 16 a side view diagram showing the distribution of sensed signal of the lens shown in FIG. 13

FIG. 15 is a top view diagram showing the distribution of sensed signal of the lens 400 shown in FIG. 13. FIG. 16 a side view diagram showing the distribution of sensed signal of the lens 400 shown in FIG. 13. As illustrated, even though the lens 400 contains seven refraction layers and as the first layer 43 is located at the lens bottom 11, its sensed signal is perpendicular to the lens bottom 11 and is therefore omitted.

FIGS. 15 and 16 depict six sensed signals, A, B, C, D, E, and F which are the signals refracted by the second, third, fourth, fifth, sixth, seventh layers 34, 35, 36, 37, 38, and 39 respectively. The six signals manifest a radial distribution in the top view diagram shown in FIG. 15.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A lens with layered concentric structure, comprising:
    a cup-shaped body having a lens bottom and a lens member extended upward from said lens bottom and forming an included angle between 46 and 52 degrees with said lens bottom;
    wherein said lens member comprises, from bottom to top, a first layer, a second layer, a third layer, a fourth layer, and a fifth layer;
    each layer comprises a plurality of refraction portions;
    each refraction portion comprises a plurality of concentrically arranged refraction elements; and
    each layer contains a bottom side, a top side parallel to said bottom side, and two lateral sides connecting the two ends of said bottom and top sides, respectively.

2. The lens with layered concentric structure according to claim 1, wherein said first layer has a circular shape of diameter 8mm; said second layer has an arc-shaped bottom side whose length is between 3.9 to 4.1 mm, an arc-shaped top side whose length is between 9.9 to 10.1 mm, and two lateral sides whose length is between 5.1 to 5.3 mm; said third layer has a bottom side whose length is between 6.88 to 7.08 mm, a top side whose length is between 10.23 to 10.43 mm, and two lateral sides whose length is between 4.9 to 5.1 mm; said fourth layer has a bottom side whose length is between 5.06 to 5.26 mm, a top side whose length is between 6.11 to 6.31 mm, and two lateral sides whose length is between 4.9 to 5.1 mm; and said fifth layer has a bottom side whose length is between 4.56 to 4.76 mm, a top side whose length is between 6.44 to 6.64 mm, and two lateral sides whose length is between 11.9 to 12.1 mm.

3. The lens with layered concentric structure according to claim 1, wherein said first layer has a circular shape of diameter 4.6 mm; said second layer has an arc-shaped bottom side whose length is between 3.15 to 3.35 mm, an arc-shaped top side whose length is between 8.06 to 8.26 mm, and two lateral sides whose length is between 2.39 to 2.59 mm; said third layer has an arc-shaped bottom side whose length is between 4.34 to 4.54 mm, an arc-shaped top side whose length is between 7.55 to 7.75 mm, and two lateral sides whose length is between 3.81 to 4.01 mm; said fourth layer has a bottom side whose length is between 3.4 to 3.6 mm, a top side whose length is between 4.9 to 5.1 mm, and two lateral sides whose length is between 6.5 to 6.7 mm; and a fifth layer has a bottom side whose length is between 3.7 to 3.9 mm, a top side whose length is between 4.7 to 4.9 mm, and two lateral sides whose length is between 5.9 to 6.1 mm.

4. The lens with layered concentric structure according to claim 3, wherein said lens member further comprises a sixth layer next to said fifth layer; and said sixth layer has a bottom side whose length is between 4.7 to 4.9 mm, a top side whose length is between 6.4 to 6.6 mm, and two lateral sides whose length is between 10.1 to 10.3 mm.

5. The lens with layered concentric structure according to claim 1, wherein said first layer has a circular shape of diameter 4.6 mm; said second layer has an arc-shaped bottom side whose length is between 3.15 to 3.35 mm, an arc-shaped top side whose length is between 8.06 to 8.26 mm, and two lateral sides whose length is between 2.39 to 2.59 mm; said third layer has an arc-shaped bottom side whose length is between 4.34 to 4.54 mm, an arc-shaped top side whose length is between 7.55 to 7.75 mm, and two lateral sides whose length is between 3.81 to 4.01 mm; said fourth layer has a bottom side whose length is between 3.39 to 3.59 mm, a top side whose length is between 4.41 to 4.61 mm, and two lateral sides whose length is between 4.4 to 4.6 mm; and a fifth layer has a bottom side whose length is between 3.77 to 3.97 mm, a top side whose length is between 4.65 to 4.85 mm, and two lateral sides whose length is between 4.4 to 4.6 mm.

6. The lens with layered concentric structure according to claim 5, wherein said lens member further comprises a sixth layer next to said fifth layer; and said sixth layer has a bottom side whose length is between 3.59 to 3.79 mm, a top side whose length is between 4.5 to 4.7 mm, and two lateral sides whose length is between 5.9 to 6.1 mm.

7. The lens with layered concentric structure according to claim 1, wherein said first layer has a circular shape of diameter 4.6 mm; said second layer has an arc-shaped bottom side whose length is between 3.15 to 3.35 mm, an arc-shaped top side whose length is between 8.06 to 8.26 mm, and two lateral sides whose length is between 2.39 to 2.59 mm; said third layer has an arc-shaped bottom side whose length is between 4.34 to 4.54 mm, an arc-shaped top side whose length is between 7.55 to 7.75 mm, and two lateral sides whose length is between 3.81 to 4.01 mm; said fourth layer has a bottom side whose length is between 3.39 to 3.59 mm, a top side whose length is between 4.41 to 4.61 mm, and two lateral sides whose length is between 4.4 to 4.6 mm; and a fifth layer has a bottom side whose length is between 3.77 to 3.97 mm, a top side whose length is between 4.65 to 4.85 mm, and two lateral sides whose length is between 4.4 to 4.6 mm.

8. The lens with layered concentric structure according to claim 7, wherein said lens member further comprises a sixth layer next to said fifth layer and a seventh layer next to said sixth layer; said sixth layer has a bottom side whose length is between 3.59 to 3.79 mm, a top side whose length is between 4.5 to 4.7 mm, and two lateral sides whose length is between 5.9 to 6.1 mm; and said seventh layer has a bottom side whose length is between 4.04 to 4.24 mm, a top side whose length is between 5.13 to 5.33 mm, and two lateral sides whose length is between 8.4 to 8.6 mm.

\* \* \* \* \*